United States Patent
Marks et al.

(10) Patent No.: US 9,085,658 B2
(45) Date of Patent: Jul. 21, 2015

(54) DIVINYLARENE DIOXIDE FORMULATIONS FOR VACUUM RESIN INFUSION MOLDING

(75) Inventors: Maurice J. Marks, Lake Jackson, TX (US); Gary A. Hunter, Lake Jackson, TX (US)

(73) Assignee: Blue Cube IP LLC, Midland, MI (US)

(*) Notice: Subject to any disclaimer, the term of this patent is extended or adjusted under 35 U.S.C. 154(b) by 280 days.

(21) Appl. No.: 13/063,281

(22) PCT Filed: Nov. 23, 2009

(86) PCT No.: PCT/US2009/065437
§ 371 (c)(1),
(2), (4) Date: Mar. 10, 2011

(87) PCT Pub. No.: WO2010/077485
PCT Pub. Date: Jul. 8, 2010

(65) Prior Publication Data
US 2011/0163474 A1    Jul. 7, 2011

Related U.S. Application Data

(60) Provisional application No. 61/141,471, filed on Dec. 30, 2008.

(51) Int. Cl.
*C08G 59/24* (2006.01)
*C08G 59/50* (2006.01)
*B29C 70/44* (2006.01)

(52) U.S. Cl.
CPC .......... *C08G 59/245* (2013.01); *C08G 59/5006* (2013.01); *B29C 70/443* (2013.01); *Y02E 10/721* (2013.01); *Y02E 10/726* (2013.01)

(58) Field of Classification Search
USPC ........................................... 264/257
See application file for complete search history.

(56) References Cited

U.S. PATENT DOCUMENTS 4,902,215 A    2/1990    Seemann

FOREIGN PATENT DOCUMENTS

| | | |
|---|---|---|
| GB | 854679 | 10/1958 |
| JP | 62153316 | 7/1987 |
| WO | 2004020506 | 3/2004 |
| WO | 2007009957 | 1/2007 |

OTHER PUBLICATIONS

U.S. Appl. No. 61/141,457, filed Dec. 30, 2008, Marks et al.

*Primary Examiner* — Joseph S Del Sole
*Assistant Examiner* — John Robitaille
(74) *Attorney, Agent, or Firm* — Joe R. Prieto

(57) ABSTRACT

A resin formulation for use in a vacuum resin infusion molding process, said formulation comprising (a) a divinylarene dioxide, and (b) a polyaminoether; wherein the polyaminoether does not have pendent hydroxyl groups; and wherein the resin formulation may have a low viscosity of less than about 400 mPa-s.

10 Claims, No Drawings

DIVINYLARENE DIOXIDE FORMULATIONS FOR VACUUM RESIN INFUSION MOLDING

CROSS REFERENCE TO RELATED APPLICATIONS

This is a §371 application of PCT International Patent Application Number PCT/U.S. Ser. No. 09/065,437 filed Nov. 23, 2009, and claims priority from provisional application Ser. No. 61/141,471 filed Dec. 30, 2008, each of which is incorporated herein by reference in its entirety.

BACKGROUND OF THE INVENTION

1. Field of the Invention

The present invention is related to a resin formulation useful for vacuum resin infusion molding processes, wherein the resin formulation is based on a divinylarene dioxide.

2. Description of Background and Related Art

It is well known to use epoxy resins in vacuum resin infusion molding processes. A vacuum resin infusion molding process requires epoxy resin formulations having low viscosity for example less than 300 mPa·s at 25° C. However, conventional epoxy resins typically have a viscosity higher than 300 mPa·s at 25° C.; and therefore, when a conventional epoxy resin is used in a vacuum resin infusion molding process, a reactive diluent is typically needed and added to the conventional epoxy resin to lower the viscosity of the epoxy resin and achieve the required low viscosity in order for the conventional epoxy resin formulation to be useful in the vacuum resin infusion molding process.

In addition, a problem arises when a resin formulation, comprising the conventional epoxy resin and the reactive diluent, is cured—the resulting cured thermoset exhibits a decreased heat resistance. Heat resistance is an important property for cured thermosets which must meet certain commercial industry standards. For example, Germanischer Lloyd requires the cured thermoset to have a Heat Deflection Temperature of 70° C. or greater (ISO 75 Method A). The decreased heat resistance can be only partially compensated by including relatively costly cycloaliphatic amine curing agents in the formulation. Accordingly, epoxy resin formulations having low viscosity and good heat resistance after curing which do not require the use of cycloaliphatic amine curing agents are needed for vacuum resin infusion molding, especially for large parts such as wind turbine blades, generator nacelles and nose cones, which are made using the vacuum resin infusion molding process.

Divinylarene dioxides, such as divinylbenzene dioxide (DVBDO), are class of diepoxides which have relatively low liquid viscosity (for example less than 25 mPa·s at 25° C.) and high rigidity (for example less than or equal to 10 as measured by the calculated number of rotational degrees of freedom of the dioxide excluding side chains using the method of Bicerano (*Prediction of Polymer Properties*, Dekker, New York, 1993). The rigidity of divinylarene dioxides are higher than the conventional epoxy resins previously used in formulations for vacuum resin infusion molding. The resulting divinylarene-based formulations do not require the use of cycloaliphatic amine curing agents to obtain the required heat resistance. Therefore, it would be an improvement in the art to provide a divinylarene-based formulation useful for vacuum resin infusion molding.

British Patent No. GB 854679 describes the curing of DVBDO with polyfunctional amines; and Japanese Patent No. JP 62153316 describes compositions made from epoxy resins, curing agents, and hydroxyl-functional amines. Neither of the above two prior art references describes the use of polyaminoethers as a polyfunctional amine curing agent for DVBDO.

It is therefore desirable to provide a resin formulation for use in a vacuum resin infusion molding process which includes (a) a divinylarene dioxide, and (b) a polyaminoether.

SUMMARY OF THE INVENTION

One embodiment of the present invention is directed to a resin formulation for use in a vacuum resin infusion molding process. The resin formulation of the present invention includes (a) a divinylarene dioxide, and (b) a polyaminoether; wherein the polyaminoether does not have pendent hydroxyl groups. In one embodiment of the present invention, the resin formulation has a low viscosity (for example less than 400 mPa·s at 25° C.).

Vacuum resin infusion molding formulations comprising divinylarene dioxides, particularly those derived from divinylbenzene such as divinylbenzene dioxide (DVBDO), and polyaminoethers are novel compositions offering both a low viscosity (for example less than 400 mPa·s at 25° C.), and a good heat resistance (for example a $T_g$ greater than 80° C.).

Another embodiment of the present invention is directed to a vacuum resin infusion molding process using the above resin formulation.

One advantage of the resulting divinylarene-based formulation of the present invention is that the formulation does not require the use of a cycloaliphatic amine curing agent to obtain the required heat resistance. The divinylarene-based formulation of the present invention is particularly useful for vacuum resin infusion molding. One example of a primary use of the novel divinylarene-based formulation of the present invention is in the preparation of fiber reinforced structural composites such as wind turbine blades, generator nacelles, and nose cones.

Divinylarene dioxides useful in the present invention have a much lower viscosity than epoxy resins known in the art for vacuum resin infusion molding. For example, non-ether analogs of a polyaminoether, such as 1,4-diaminobutane, used with the divinylarene dioxide, has a relatively poor compatibility with known epoxy resins and are therefore not useful in vacuum resin infusion molding formulations. However, the combination of a divinylarene dioxide and a polyaminoether as novel compositions have a unique balance of low viscosity and good heat resistance; and can be used in vacuum resin infusion molding formulations.

DETAILED DESCRIPTION OF THE INVENTION

The present invention is not limited to the specific embodiments described below, but rather; the present invention includes all alternatives, modifications, and equivalents falling within the true scope of the appended claims.

The present invention, in general, is a resin formulation for use in a vacuum resin infusion molding process, said formulation comprising (a) a divinylarene dioxide, and (b) a polyaminoether; wherein the resin formulation has a viscosity of less than about 400 mPa·s at 25° C.

Divinylarene dioxides, particularly those derived from divinylbenzene such as for example divinylbenzene dioxide (DVBDO), are class of diepoxides which have a relatively low liquid viscosity but a higher rigidity than conventional epoxy resins.

The divinylarene dioxide useful in the present invention may comprise, for example, any substituted or unsubstituted arene nucleus bearing two vinyl groups in any ring position.

The arene portion of the divinylarene dioxide may comprise benzene, substituted benzenes, ring-annulated benzenes, substituted ring-annulated benzenes, homologously bonded benzenes, substituted homologously bonded benzenes, or mixtures thereof. The divinylarene portion of the divinylarene dioxide may be ortho, meta, or para isomers or any mixture thereof. Additional substituents may consist of H$_2$O$_2$-resistant groups including saturated alkyl, aryl, halogen, nitro, isocyanate, or RO— (where R may be a saturated alkyl or aryl). Ring-annulated benzenes may comprise for example naphthlalene, tetrahydronaphthalene, and the like. Homologously bonded (substituted) benzenes may comprise for example biphenyl, diphenylether, and the like.

In one embodiment, the divinylarene dioxide used in the present invention may be produced, for example, by the process described in U.S. Patent Application Ser. No. 61/141, 457, filed of even date herewith, by Marks et al., incorporated herein by reference.

The divinylarene dioxide used in the resin formulation composition of the present invention may be illustrated generally by the following general chemical Structures I-IV as follows:

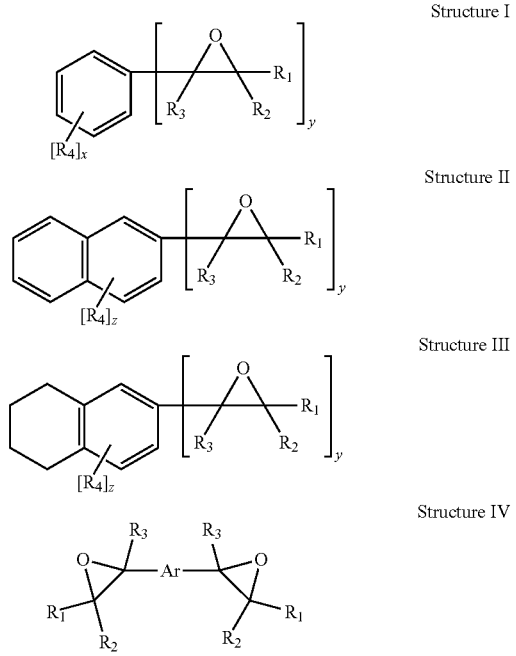

Structure I

Structure II

Structure III

Structure IV

In the above Structures I, II, III and IV of the divinylarene dioxide component of the present invention, each R$_1$, R$_2$, R$_3$ and R$_4$ individually may be hydrogen, an alkyl, cycloalkyl, an aryl or an aralkyl group; or a H$_2$O$_2$-resistant group including for example a halogen, a nitro, an isocyanate, or an RO group, wherein R may be an alkyl, aryl or aralkyl; x may be an integer of 0 to 4; y may be an integer greater than or equal to 2; x+y may be an integer less than or equal to 6; z may be an integer of 0 to 6; and z+y may be an integer less than or equal to 8; and Ar is an arene fragment including for example, 1,3-phenylene group.

The divinylarene dioxide component useful in the present invention may include for example divinylbenzene dioxide, divinylnaphthalene dioxide, divinylbiphenyl dioxide, divinyldiphenylether dioxide, and mixtures thereof.

Structure V below illustrates an embodiment of a preferred chemical structure of the DVBDO useful in the present invention:

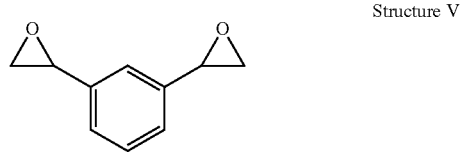 [SMILES: c1cc(C2CO2)cc(C2CO2)c1]

Structure V

Structure VI below illustrates another embodiment of a preferred chemical structure of the DVBDO useful in the present invention:

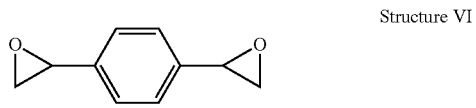 [SMILES: c1cc(C2CO2)ccc1C1CO1]

Structure VI

When DVBDO is prepared by the processes known in the art, it is possible to obtain one of three possible isomers: ortho, meta, and para. Accordingly, the present invention includes a DVBDO illustrated by any one of the above Structures individually or as a mixture thereof. Structures V and VI above show the meta (1,3-DVBDO) and para isomers of DVBDO, respectively. The ortho isomer is rare; and usually DVBDO is mostly produced generally in a range of from about 9:1 to about 1:9 ratio of meta (Structure V) to para (Structure VI) isomers. The present invention preferably includes as one embodiment a range of from about 6:1 to about 1:6 ratio of Structure V to Structure VI, and in other embodiments the ratio of Structure V to Structure VI may be from about 4:1 to about 1:4 or from about 2:1 to about 1:2.

In one embodiment, the divinylarene dioxide useful in the present invention comprises, for example, divinylbenzene dioxide (DVBDO), a low viscosity liquid epoxy resin. The viscosity of the divinylarene dioxide used in the process of the present invention ranges generally from about 10 mPa·s to about 100 mPa·s, preferably from about 10 mPa·s to about 50 mPa·s, and more preferably from about 10 mPa·s to about 25 mPa·s at 25° C.

The concentration of the divinylarene oxide used in the present invention may range generally from about 0.1 weight percent (wt %) to about 99.9 wt %, preferably from about 1 wt % to about 99 wt %, and more preferably from about 2 wt % to about 98 wt %.

One of the advantageous properties of the divinylarene dioxides useful in the present invention, is their thermal stability which allows their use in formulations or processing at moderate temperatures (for example, at from about 100° C. to about 200° C.) for up to several hours (for example, for at least 2 hours) without oligomerization or homopolymerization. Oligomerization or homopolymerization during formulation or processing is evident by a substantial increase in viscosity or gelling (crosslinking). The divinylarene dioxides useful in the present invention have sufficient thermal stability such that the divinylarene dioxides do not experience a substantial increase in viscosity or gelling during formulation or processing at moderate temperatures.

Another one of the advantageous properties of the divinylarene dioxide useful in the present invention is its rigidity. The rigidity property of the divinylarene dioxide is measured by a calculated number of rotational degrees of freedom of the dioxide excluding side chains using the method of Bicerano described in *Prediction of Polymer Properties*, Dekker, New York, 1993. The rigidity of the divinylarene dioxide used in the present invention may range generally from about 6 to about 10, preferably from about 6 to about 9, and more preferably from about 6 to about 8 rotational degrees of freedom.

The polyaminoether useful in the process of the present invention may include for example a straight chain or branched chain polyamine wherein the chain contains at least one oxygen atom; and mixtures thereof. Examples of polyaminoethers useful in the present invention include poly (oxypropylene) diamine having a molecular weight ranging from about 200 g/mol to about 4200 g/mol, and poly(oxypropylene) triamine having a molecular weight ranging from about 400 g/mol and about 5500 g/mol; and mixtures thereof. Other examples of polyaminoethers useful in the present invention include 4,7-dioxadecane-1,10-diamine; 4,9 dioxadodecane-1,12-diamine; 4,7,10-trioxamidecane-1,13-diamine; and mixtures thereof.

The concentration of the polyaminoether used in the present invention may range generally from about 5 wt % to about 95 wt %, preferably from about 8 wt % to about 60 wt %, and more preferably from about 10 wt % to about 50 wt %. In another embodiment of the present invention, the concentration of the polyaminoether may be from about 11 wt % to about 93 wt %.

The polyaminoethers useful in the present invention are oligomeric polyfunctional amines which improve the flexibility of resulting thermosets without causing a significant increase in the viscosity of the infusion formulation. This is a significant benefit for the novel use of these oligomeric polyfunctional amines. In contrast, oligomeric polyfunctional amines of the prior art bearing pendant hydroxyl groups such as those derived from polyamines and epoxides are highly viscous liquids or semi-solids which significantly increase the viscosity of the infusion formulation.

The polyaminoethers used in the present invention also have good compatibility with epoxy resins unlike prior art polyamines having butyl or larger aliphatic linking groups between amino functionality.

In preparing the formulations of the present invention, in one embodiment, a monofunctional component may optionally be included in the formulation. For example, the optional monofunctional component of the formulation of the present invention may include an epoxy resin different than the divinylarene dioxides described above. The optional epoxy resin used in the present formulation may include for example monoepoxides such as phenyl glycidyl ether, cresyl glycidyl ether, 2-ethylhexyl glycidyl ether, and dodecyl glycidyl ether; and mixtures thereof. The monofunctional component optionally used in the present invention may also include for example monophenols such as phenol, cresol, p.-t-butylphenol, nonylphenol, and pentadecylphenol; and mixtures thereof.

The concentration of the optional monofunctional component used in the present invention may range generally from 0 wt % to about 50 wt %, preferably from about 0 wt % to about 25 wt %, more preferably from about 0 wt % to about 10 wt %, and most preferably from about 0 wt % to about 5 wt %. In another embodiment the monofunctional component may be from about 0.01 wt % to about 50 wt %.

In another embodiment, optional multi-functional epoxy resins or multi-functional phenols may be added to the formulation of the present invention.

As an illustration of another embodiment of the present invention, one or more epoxy resins comprising those derived from diphenols such as bisphenol A or bisphenol F; halogenated bisphenols such as tetrabromobisphenol A; diphenols such as biphenol, thiodiphenol, and dinaphthol; and/or from alcohols such as butanediol or polypropylene glycol; or mixtures thereof, may be optionally included in the formulations of the present invention as co-monomers, formulation additives, or both.

The concentration of the optional epoxy resin used in the present invention may range generally from generally from 0 wt % to about 99.9 wt %; preferably from about 0.1 wt % to about 99.9 wt %, more preferably from about 1 wt % to about 99 wt %, and most preferably from about 2 wt % to about 98 wt %. In another embodiment the epoxy resin may be from about 0.01 wt % to about 99.9 wt %.

An assortment of additives may be added to the formulation of the present invention including for example, other resins, catalysts, stabilizers, fillers, plasticizers, and the like and mixtures thereof.

The concentration of the additives used in the present invention may range generally from 0 wt % to about 99.9 wt %; preferably from about 0.01 wt % to about 99.9 wt %, preferably from about 1 wt % to about 99 wt %, and more preferably from about 2 wt % to about 98 wt %.

The resin formulation of the present invention may be prepared by mixing or blending together components (a) a divinylarene dioxide and (b) a polyaminoether. There is no criticality to the order of mixture of components (a) and (b).

In one embodiment of the present invention, the resin formulation may include an optional epoxy resin such as bisphenol A diglycidyl ether, and such optional epoxy resin may be added to component (a) divinylarene dioxide. In another embodiment, if optional other polyamines are used in the present invention, such optional polyamines such as diethylenetriamine may be added to component (b) polyaminoether. Preferably, all of the (a) components are mixed together and all of the (b) components are mixed together and then the components (a) and (b) are mixed to form the formulation of the present invention for the infusion molding process.

Although the viscosity of the divinylarene dioxide-based resin formulation produced by the process of the present invention are preferably less than about 400 mPa·s at 25° C., it is contemplated by the overall process of the present invention to include alternative compositions with viscosities that range generally from about 5 mPa·s to about 300,000 mPa·s, preferably from about 10 mPa·s to about 5,000 mPa·s, and more preferably from about 20 mPa·s to about 400 mPa·s at 25° C. For example, when using solid epoxy resins (SER) or phenolic epoxy resins (PER) with for example DVBDO, it is possible to have very high viscosities that are still amenable to the vacuum resin infusion molding process utilizing elevated temperatures to reduce the viscosity. Accordingly, these types of resin formulations having higher viscosities are not excluded from the present invention.

The divinylarene dioxide and the polyaminoether components, optionally combined with other epoxy resins, are mixed together and then cured under vacuum infusion molding curing conditions.

Vacuum resin infusion molding is a process by which dry fiber reinforcement is placed under a vacuum and infused with a thermosetting resin to form a composite such as described in U.S. Pat. No. 4,902,215.

Curing of the formulation may be carried out at a temperature generally in the range of from about 15° C. to about 200° C., preferably from about 20° C. to about 180° C., and more preferably from about 25° C. to about 150° C.

Glass transition temperature (Tg) is a property that is a good indicator of Heat Deflection Temperature (HDT) as measured by ISO 75 Method A as required by the Germanischer Lloyd requirement for a cured thermoset, generally having a HDT of 70° C. or greater.

The resulting product of the present invention has good heat resistance after cure as determined by Tg using differential scanning calorimetry (DSC). The Tg of the cured formulation of the present invention ranges generally from about 40° C. to about 200° C., preferably from about 50° C. to about 180° C., and more preferably from about 60° C. to about 170° C.

Exhibiting the advantageous properties mentioned above, the formulations of the present invention comprising divinylarene dioxides such as DVBDO and polyaminoethers are also useful in a wide variety of applications such as thermoset compositions and articles.

The following examples and comparative examples further illustrate the present invention in detail but are not to be construed to limit the scope thereof.

Various terms and designations used in the following examples are explained as follows: DVBDO stands for divinylbenzene dioxide; DGEBPA stands for diglycidyl ether of bisphenol A; D.E.R. 383 epoxy resin is a DGEPBA epoxy resin commercially available from The Dow Chemical Company having an EEW of 180; Jeffamine D230 polyaminoether is a poly(oxypropylene diamine) (D230) commercially available from Huntsman Performance Products; ChemMod 67 resin is a butanedioldiglycidyl ether (BDDGE) commercially available from Polystar LLC; DSC stands for differential scanning calorimetry; and $T_g$ stands for glass transition temperature.

The following standard analytical equipment and methods are used in the Examples: Viscosity is measured by an ARES Rheomechanical Analyzer.

Example 1

DVBDO Formulation without Cycloaliphatic Amines

A mixture of 61.8 g of D.E.R. 383 epoxy resin, 10.9 g of DVBDO, 23.6 g of 230 molecular weight Jeffamine D230 polyaminoether, and 3.7 g of aminoethylpiperazine has a viscosity at 25° C. of 150 mPa·s.

Example 2

DVBDO Formulation without Cycloaliphatic Amines

A mixture of 57.4 g of D.E.R. 383 epoxy resin, 14.3 g of DVBDO, 24.5 g of 230 molecular weight Jeffamine D230 polyaminoether, and 3.8 g of aminoethylpiperazine has a viscosity at 25° C. of 100 mPa·s.

Comparative Example A

BDDGE Formulation with a Cycloaliphatic Amine

A mixture of 64.9 g of D.E.R. 383 epoxy resin, 11.5 g of butanedioldiglycidyl ether (ChemMod 67 resin), 17.3 g of 230 molecular weight Jeffamine D230 polyaminoether, 3.2 g of aminoethylpiperazine, and 3.2 g of isophoronediamine has a viscosity at 25° C. of 200 mPa·s.

The formulation mixtures of Example 1, Example 2 and Comparative Example A were each cast in a mold to form clear castings measuring 200 mm×300 mm×4 mm. The castings were cured for 4 hours at 70° C. and post cured for 4 hours at 100° C. The clear castings were tested for physical properties. Tg was measured using a model Q2000 Differential Scanning calorimeter by TA Instruments with a temperature ramp rate of 10° C. per minute. The tensile properties were determined in accordance with ASTM D638. The flexural properties were determined in accordance with ASTM D790. Table I describes the results of the aforementioned tests and illustrates that the compositions of the present invention provide both low formulation viscosity and comparable improved thermal and mechanical properties without the use of a cycloaliphatic amine curing agent.

TABLE I

| | Tg (° C.) | Tensile strain (%) | Tensile modulus (MPa) | Tensile stress (MPa) | Flexural modulus (MPa) | Flexural strength (MPa) |
|---|---|---|---|---|---|---|
| Comparative Example A | 94 | 9.7 | 3133 | 63.8 | 2381 | 109 |
| Example 1 | 92 | 12.5 | 3308 | 71.9 | 2965 | 116 |
| Example 2 | 95 | 10.6 | 3450 | 72.9 | 2987 | 118 |

It will be obvious to persons skilled in the art that certain changes may be made in the methods described above without departing from the scope of the present invention. It is therefore intended that all matter herein disclosed be interpreted as illustrative only and not as limiting the scope of protection sought. Moreover, the process of the present invention is not to be limited by the specific examples set forth above including the tables to which they refer. Rather, these examples and the tables they refer to are illustrative of the process of the present invention.

What is claimed is:

1. A resin formulation comprising a blend of (a) a divinylarene dioxide having a viscosity at 25° C. of from about 10 mPa·s to about 100 mPa·s, and (b) a polyaminoether; wherein the polyaminoether is devoid of pendent hydroxyl groups; wherein the polyaminoether is compatible with the divinylarene dioxide; wherein the resin formulation has a viscosity of less than about 400 mPa·s at 25° C.; and wherein the resin formulation being cured forms a cured thermoset having a balance of properties including a heat resistance as determined by Tg wherein the thermoset exhibits a Tg of from about 60° C. to about 170° C.; or wherein the thermoset exhibits a heat deflection temperature of 70° C. or greater.

2. The resin formulation of claim 1, wherein the polyaminoether component (b) contains up to at least 50 weight percent of a polyaminoether that does not have pendent hydroxyl groups.

3. The resin formulation of claim 1, wherein the viscosity of the resin formulation is in the range of from about 25 mPa·s to about 300 mPa·s at 25° C.

4. The resin formulation of claim 1, wherein the divinylarene dioxide is divinylbenzene dioxide; wherein the concentration of said divinylarene dioxide ranges from about 2 weight percent to about 98 weight percent.

5. The resin formulation of claim 1, wherein the polyaminoether is a poly(oxypropylene diamine); wherein the concentration of said polyaminoether ranges from about 10 weight percent to about 50 weight percent.

6. The resin formulation of claim 1, wherein the formulation includes an epoxy resin other than the divinylarene dioxide; wherein the concentration of said epoxy resin ranges from about 2 weight percent to about 98 weight percent.

7. The resin formulation of claim 6, wherein the epoxy resin is diglycidylether of bisphenol A.

8. A cured article prepared by curing the resin formulation of claim 1 at a temperature in the range of from about 25° C. to about 150° C.

9. The cured article of claim 8, wherein the $T_g$ of the cured article ranges from about 60° C. to about 170° C.

10. A vacuum resin infusion molding process comprising curing the resin formulation of claim 1 under vacuum resin infusion molding curing conditions.

\* \* \* \* \*